UNITED STATES PATENT OFFICE.

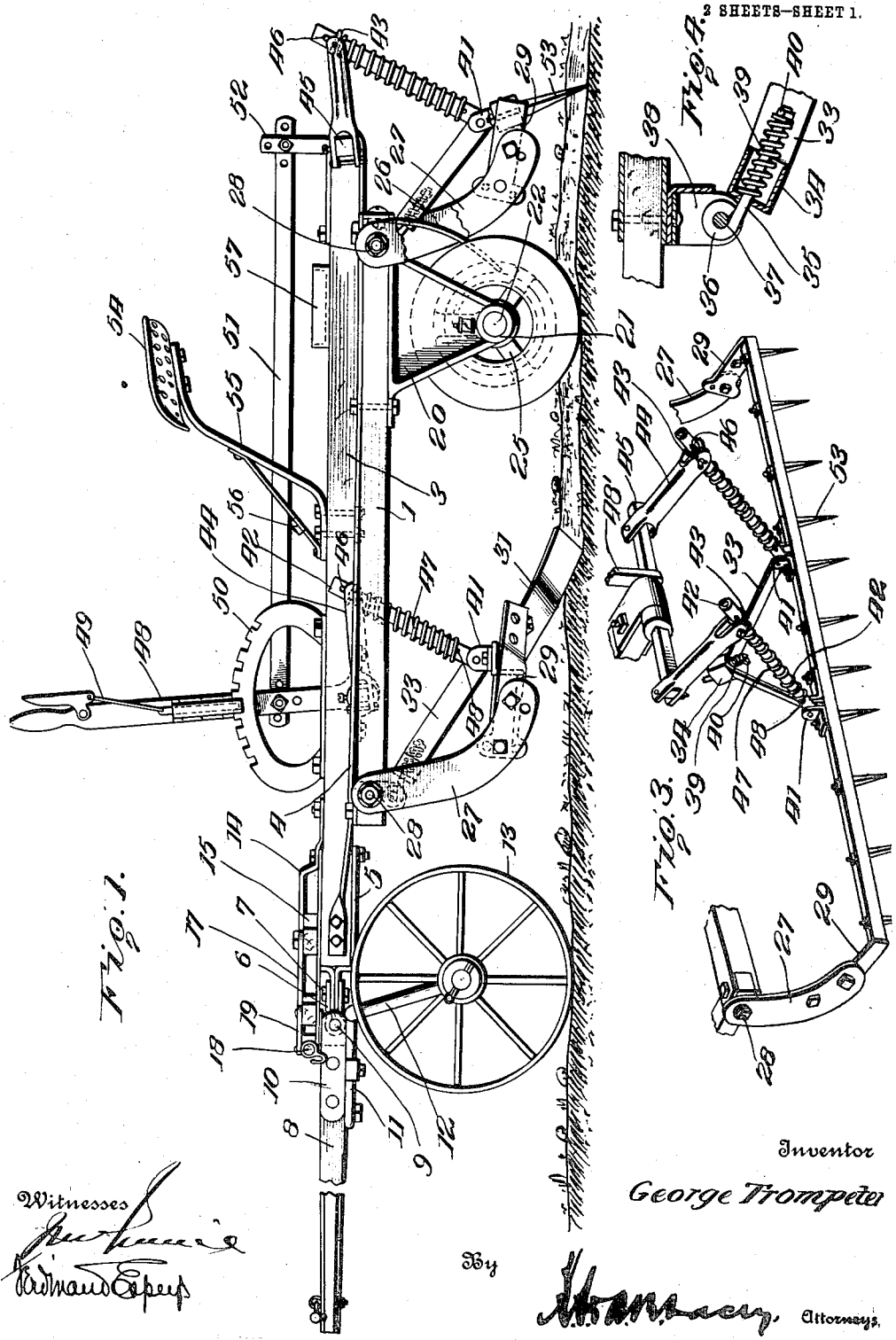

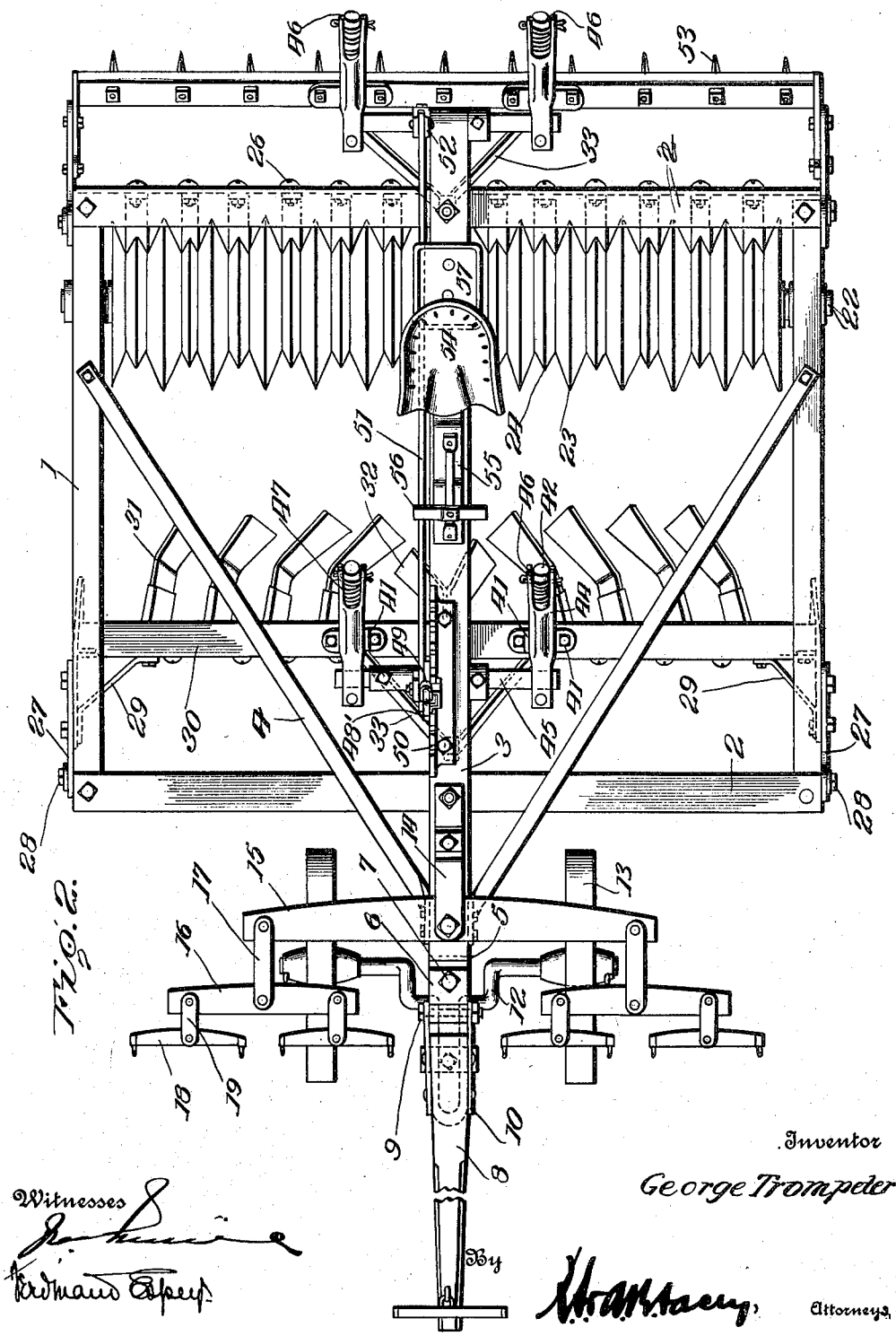

GEORGE TROMPETER, OF CLEARWATER, KANSAS.

AGRICULTURAL MACHINE.

1,073,373.  Specification of Letters Patent.  Patented Sept. 16, 1913.

Application filed March 1, 1912. Serial No. 680,952.

*To all whom it may concern:*

Be it known that I, GEORGE TROMPETER, citizen of the United States, residing at Clearwater, in the county of Sedgwick and State of Kansas, have invented certain new and useful Improvements in Agricultural Machines, of which the following is a specification.

My invention relates to improvements in agricultural machines and has for its object the provision of a simple and efficient machine by which the soil may be pulverized, harrowed and packed by a single operation or may be otherwise treated according to the demands of the particular crop to be cultivated.

A further object of the invention is to provide a machine which will be of light draft and which may be set to take into the ground to any desired extent and by the use of which a fine seed bed for grass seeds may be made.

The invention also seeks generally to improve the construction and arrangement of the parts of an agricultural machine whereby the efficiency and durability of the machine will be increased while the cost of production will be kept at a minimum.

In the accompanying drawings, which are to be taken as a part hereof: Figure 1 is a side elevation of my improved machine. Fig. 2 is a plan view thereof; Fig. 3 is a detail perspective; and Fig. 4 is an enlarged detail section.

Corresponding and like parts are referred to in the following description and indicated in all the views of the accompanying drawings by the same reference characters.

The invention will be herein first fully described and its novel features will then be subsequently pointed out in the appended claims.

In carrying out my invention, I employ a main frame consisting of side bars 1, cross bars 2 connecting the same, a central longitudinal beam 3 secured upon the cross bars and projecting slightly beyond the same at its ends, and braces 4 connecting the said central longitudinal bar with the side bars. To the front end of the central longitudinal beam or perch I secure the brackets 5, to the front end of which a clip 6 is pivotally attached by a bolt 7, as clearly shown. The clip is thus adapted to swing in a horizontal plane about the front end of the perch and a draft tongue 8 is pivoted to the front end of the clip by means of a bolt 9 inserted through the same and attaching plates 10 secured to the sides of the tongue, as shown. The tongue is thus mounted so as to have a vertical movement and consequently accommodate itself to any unevenness of the ground over which the machine is drawn. To relieve the strain on the necks of the draft animals and also to aid in steering the machine and facilitate its passage over the field, I secure to the underside of the tongue at the rear end thereof, a loop or crank arm 11 formed at the center of an arched axle 12, on the ends of which are mounted steering wheels 13. Upon the upper side of the perch 3, near the front end thereof, I secure a bracket 14 between which and the perch is pivoted a draft bar 15 having double trees 16 connected to its ends by links 17 and swingle trees 18 are connected to the ends of the double trees in like manner by links 19 to facilitate the connecting of the machine to the team of horses or other draft animals.

Depending from the side bars 1 of the main frame, at or near the rear ends thereof, are short standards 20 having journal boxes 21 at their lower ends to receive the ends of an axle 22 carrying a roller or packer consisting of a series of disks 23 and 24, the disks 24 being considerably less in diameter than the disks 23 and alternately therewith. The disks are all tapered or beveled toward their edges or peripheries so that they will readily take into the ground and aid in the cutting up of the same, while at the same time they are arranged closely together so that they present a continuous surface to the ground and consequently pack the same, as will be understood. The disks are all hollow and secured to the axle or shaft 22 by radial arms or spokes 25, as will be readily understood. Secured to and depending from the rear cross bar 2 of the main frame are a series of scrapers 26 which extend to the packer and into the spaces between the larger disks 23 so that any soil which may cling to the surface of the disks in the operation of the machine will be removed therefrom so that they will remain clean and therefore efficiently perform their functions.

To the main frame, at or near the front corners thereof, I pivotally secure the hangers 27 which are given the curved formation illustrated to extend downwardly and slightly rearward from their pivots 28 and to the lower free ends of the said hangers I secure the brackets 29 which project rearwardly and form supports for a transverse beam 30. Pulverizing blades or cutters 31 are secured to and project downwardly and rearwardly from the said beam so as to break into the ground and cut up and slightly turn the earth, as will be understood. The pulverizing blade or cutters are preferably of a twisted formation and the blades at the opposite sides of the longitudinal center of the machine are turned in opposite directions so that their ends will project toward the center of the machine and consequently throw the loosened and turned-up dirt toward the center. This arrangement of the blades furthermore causes each blade to receive and act upon part of the dirt turned up by the adjacent inner blade so that the breaking up of the soil will be complete, and to further break up and pulverize the soil the blade 32 at the center of the beam 30 is made V-shaped or with diverging arms extending toward the adjacent inner blades, as clearly shown in Fig. 2. At the center of the beam 30, I secure a yoke 33 having its front end equipped with a box or housing 34 and fitted upon a pivot bolt or hanger 35 which is provided with an eye 36 at its front end adapted to engage a supporting pin 37 within lugs 38 depending from the main frame, thereby serving to relieve the strain upon the hangers 27 in supporting the pulverizer. A spring 39 is fitted around the bolt 35 between the housing 34 and a nut 40 on the end of the bolt, so as to provide a yielding support for the yoke which will tend to hold the same up to the pivot pin 37 or will permit the same to swing backwardly when the pulverizer strikes a large rock or other obstruction. Upon the upper side of the beam 30, and preferably adjacent the ends of the yoke 33, I secure brackets 41 in which are pivoted links 42 arising from the brackets and playing through rings or collars 43 carried by the bifurcated rear ends of crank arms 44 projecting rearwardly from a rock shaft 45 mounted in suitable bearings upon the main frame. This collar 43 is pivotally mounted within the bifurcated rear end of the crank arm so that a movement of the link 42 relative to the crank arm will be permitted. The link is prevented from dropping through the collar by a supporting pin 46 inserted transversely through its upper end and adapted to rest upon the upper side of the crank arm and a spring 47 is coiled around the link between the crank arm and a pin 48 near the lower end of the link, so as to yieldingly hold the link toward its lowest position and thereby hold the pulverizer to its work while at the same time permitting it to rise freely should it strike an obstruction. Breaking or other damage to the pulverizer blades is consequently prevented. An operating lever 48' is secured to or formed rigid with the rock shaft 45 and projects upwardly therefrom where it may be conveniently grasped by the driver, said operating lever being equipped with a latch 49 adapted to engage a segmental rack 50 on the frame of the usual or any preferred construction. A connecting bar 51 has its front end pivoted to the lever 48 and its rear end pivoted to an upstanding arm 52 rising from a second rock shaft 45 mounted upon the rear end of the main frame and similar in all respects to the forward rock shaft 45.

The ground treating implement or harrow disposed at the rear of the machine is the same in all respect as that just described in advance of the packer except that, instead of the pulverizer blades 31, the transverse beam is equipped with straight or other form of harrow teeth 53.

A driver's seat 54 is secured upon the perch 3 by means of a standard 55 equipped with a foot rest 56 and a box or other receptacle 57 may be provided upon the perch over the packer to receive weights of any form to hold the machine to its work.

From the foregoing description in connection with the accompanying drawings, it will be seen that I have provided an exceedingly simple machine by the use of which at one operation the soil may be cut up and turned and then packed to form a solid bed and then harrowed so as to be left in a smooth, finely granulated condition which is best adapted to receive seed or to facilitate the growth and development of the crop.

The springs 47 mounted upon the implement sustaining links will hold the said implements to their work while at the same time permitting them to yield readily so as to clear large obstructions and thereby avoid damage to the implements. Should it be necessary for any reason to remove the implements the withdrawal of the pins 46 from the upper ends of the links will permit the links to be drawn downwardly through and from the collars 43, thereby separating the implements from the crank arms 44. If the pivots 28 and 37 be then loosened so as to permit the disengagement of the hangers mounted thereon, the entire ground treating implement may be removed to permit the substitution of a different implement or to facilitate the making of repairs. The arrangement shown in the drawings and hereinbefore described is preferred by me and is the one which will be best adapted for the work for which the machine is designed, but the harrow or the pulverizer may be omitted or the harrow may be arranged in advance of the packer and the pulverizer in rear thereof, or the pulverizer may be omitted and the harrow substituted therefor, while the pulverizer may be placed in rear of the packer with or without the harrow being used according to the conditions of the soil or the nature of the crop to be planted.

The machine will thoroughly uproot and destroy grass and weeds on early plowed ground and will at the same time pack the soil firmly and harrow it to conserve moisture. The machine is very efficient for preparing ground in the fall for sowing wheat and makes a fine solid bed, and by removing the pulverizer and placing the harrow in front of the packer will be found very advantageous for harrowing and packing the wheat in the spring. Freezing of the ground through the winter raises the soil and plants and by using my improved machine the soil may be packed firmly again without any injury to the plants.

It will be readily understood that by adjusting the lever 48' the harrow and pulverizer may be set to take into the ground to any desired depth.

Having thus described my invention, what I claim as new is:—

1. The combination with a main frame, of hangers pivoted thereto, a rock shaft mounted thereon, a ground treating implement secured to and extending between the lower ends of the hangers, links pivoted to and rising from said implement and having a sliding connection with the rock shaft, a support secured to the ground-treating implement and extending forwardly therefrom and having a yieldable connection with the frame and means for actuating the rock shaft.

2. The combination with a main frame, of hangers pivoted thereto, a ground treating implement secured to and extending between said hangers, a support secured to said implement and extending forwardly therefrom and having a yieldable connection with the frame, a rock shaft mounted upon the frame, means for actuating the rock shaft, crank arms projecting from the said rock shaft, collars pivotally attached to the ends of the crank arms, links pivoted to the ground treating implement and slidably fitting in said collars, lateral supports on the links adapted to rest upon the collars, and springs coiled around the links between stops thereon and the crank arms.

3. The combination with a main frame, of hangers pivotally attached at their upper ends to the sides of the main frame, a ground-treating implement secured to the lower ends of said hangers and extending between the same, a support secured to said implement and extending forwardly therefrom and having a yieldable pivotal connection with the frame intermediate of the points of attachment of said hangers to the frame, and means for yieldingly holding said implement in a lowered position.

4. The combination of a main frame, hangers pivoted thereto, a ground treating implement secured to and extending between the hangers, means for yieldably holding the said implement in a lowered position, a yoke at the center of said implement having a housing at its forward extremity, a bolt pivoted to the main frame and extending through the said housing, and a spring coiled around the bolt between the said housing and a stop on the bolt.

In testimony whereof I affix my signature in presence of two witnesses.

GEORGE TROMPETER [L. S.]

Witnesses:
 DAVID E. LOGER,
 AARON WHITE.